（12） United States Patent
Bauer et al.

(10) Patent No.: US 8,757,017 B2
(45) Date of Patent: Jun. 24, 2014

(54) LINEAR MOVEMENT DEVICE WITH OMEGA DRIVE

(75) Inventors: Siegfried Bauer, Volkershausen (DE); Andre Bernd, Würzburg-Versbach (DE); Sven Anhut, Schweinfurt (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 13/102,704

(22) Filed: May 6, 2011

(65) Prior Publication Data

US 2011/0271778 A1 Nov. 10, 2011

(30) Foreign Application Priority Data

May 7, 2010 (DE) .......................... 10 2010 019 681

(51) Int. Cl.
*F16H 19/06* (2006.01)
(52) U.S. Cl.
USPC ........................................ 74/89.22; 74/89.21
(58) Field of Classification Search
USPC .................................... 74/89.2, 89.21, 89.22
See application file for complete search history.

(56) References Cited

U.S. PATENT DOCUMENTS 5,267,478 A * 12/1993 Stridsberg ..................... 74/89.17
5,598,043 A * 1/1997 Hirano et al. .............. 310/12.04
5,716,187 A * 2/1998 Costa ......................... 414/751.1

(Continued)

FOREIGN PATENT DOCUMENTS

DE 2910373 9/1980
DE 3420936 12/1985

(Continued)

OTHER PUBLICATIONS

Search Report of the German Patent and Trademark Office corresponding to German Patent Application No. DE 10 2010 019 681.9 dated Oct. 25, 2010 (4 pages).

*Primary Examiner* — David M Fenstermacher
(74) *Attorney, Agent, or Firm* — Maginot, Moore & Beck (57) ABSTRACT

A linear movement device has a housing and a carriage which can move in a longitudinal direction with respect to the housing, wherein the housing extends with an essentially constant U-shaped cross-sectional shape in the longitudinal direction, with the result that the housing bounds a guide cavity, wherein the guide cavity is covered with a toothed belt which extends in the longitudinal direction, wherein the toothed belt is attached at both ends to the housing with the result that said toothed belt defines a toothed belt plane, wherein at least one separate guide rail which extends in the longitudinal direction is arranged within the guide cavity, on which guide rail at least one separate guiding carriage is mounted in a longitudinally movable fashion, which guiding carriage is permanently connected to the carriage, wherein a first and a second deflection wheel, which deflect the toothed belt out of the toothed belt plane, are rotatably attached to the carriage, wherein a rotatable drive wheel, which is in drive-transmitting engagement with the toothed belt, is arranged between the first and the second deflection wheels. The carriage has a single-piece carriage base body which extends in the longitudinal direction, wherein said carriage base body is embodied as a closed tube essentially over its entire length, with the result that it bounds a carriage cavity, wherein the guiding carriage is attached to the outside of the carriage base body, preferably directly to the outside of the carriage base body, wherein the toothed belt is guided through the carriage cavity, and wherein the first and second deflection wheels and the drive wheel are arranged within the carriage cavity.

17 Claims, 7 Drawing Sheets

(56) References Cited

U.S. PATENT DOCUMENTS

| | | | |
|---|---|---|---|
| 5,816,969 A * | 10/1998 | Tsai | 474/87 |
| 5,819,584 A * | 10/1998 | Evans | 74/89.21 |
| 5,868,499 A * | 2/1999 | Greubel et al. | 384/15 |
| 6,223,611 B1 * | 5/2001 | Kelley | 74/89.21 |
| 6,626,630 B1 * | 9/2003 | Lomerson et al. | 414/749.1 |
| 7,056,245 B2 * | 6/2006 | Koase et al. | 474/133 |
| 7,241,047 B2 * | 7/2007 | Bauer | 384/15 |
| 8,516,913 B2 * | 8/2013 | Jones | 74/89.22 |
| 2007/0219031 A1 * | 9/2007 | Jones | 474/148 |
| 2009/0080816 A1 * | 3/2009 | Schroeder | 384/42 |
| 2010/0210383 A1 * | 8/2010 | Jones | 474/62 |
| 2011/0271778 A1 * | 11/2011 | Bauer et al. | 74/89.21 |

FOREIGN PATENT DOCUMENTS

| | | |
|---|---|---|
| DE | 9214125 | 2/1993 |
| DE | 20115647 | 2/2002 |
| DE | 69524534 | 5/2002 |
| EP | 0160923 | 11/1985 |
| EP | 0790098 | 8/1997 |
| EP | 0971140 | 1/2000 |
| EP | 1316396 | 6/2003 |

* cited by examiner

LINEAR MOVEMENT DEVICE WITH OMEGA DRIVE

This application claims priority under 35 U.S.C. §119 to patent application no. DE 10 2010 019 681.9, filed May 7, 2010 in Germany, the disclosure of which is incorporated herein by reference in its entirety.

BACKGROUND

The present disclosure relates to a linear movement device.

DE 201 15 647 U1 discloses a linear movement device. According to FIG. 2 in DE 201 15 647 U1, the linear movement device comprises a housing 9 on which a carriage 10; 11 is mounted so as to be movable in a longitudinal direction. The housing is manufactured from aluminum using an extrusion method, wherein the housing has an essentially U-shaped cross-sectional shape. The guide cavity in the interior of the housing is covered by a toothed belt 8 which extends over the entire length of the housing, wherein said toothed belt 8 is attached at both ends to the housing. The corresponding attachment device 3; 4; 5 allows the toothed belt to be placed under a desired tension, with the result that it is just tensioned and defines a toothed belt plane. A plurality of guide rails in the form of circular steel rods are arranged within the guide cavity. A guiding carriage 15 is mounted in a longitudinally movable fashion on these guide rails by means of rotatable running wheels which roll on the guide rails. The guiding carriage is screwed to the carriage. A total of two deflection wheels 13, which deflect the toothed belt out of the toothed belt plane, are held rotatably in the carriage. A rotatable drive wheel 12, which is in drive-transmitting engagement with the toothed belt, is arranged between the two deflection wheels. The drive wheel is provided with a dog clutch, with the result that it can be placed in a rotary drive connection with an electric motor.

The toothed belt drive described above is also referred to as an omega drive since the toothed belt in the carriage is bent in the shape of an Ω. Such drives are preferably used when the carriage is fixedly attached to a superordinate assembly, wherein the housing moves with respect to the carriage. In this context, the omega drive has the advantage that the heavy electric motor is attached to the carriage, with the result that it does not have to be moved along with it. In this arrangement of the linear movement device, depending on the position the housing forms a very long lever arm, with the result that small forces which act on the end of the housing can cause large deflection movements of the housing. Efforts are therefore made to guide the housing on the carriage in a particularly rigid fashion. At the same time, the carriage itself must also be embodied in a very rigid fashion since, owing to the long lever arm of the housing, small deformations at the carriage lead to large deflection movements at the housing. In this context it is to be noted once more that all the external forces are transmitted to the superordinate assembly via the carriage.

The known linear movement device has the disadvantage that the carriage only has a low degree of rigidity. This is due, on the one hand, to the fact that the carriage plate 10 has a comparatively large breakthrough through which the toothed belt is guided and in which the deflection roller 13 is arranged in certain sections. Furthermore, the carriage comprises a separate housing component 11 which is fixedly connected to the carriage plate only at individual attachment points. The composite composed of the carriage plate 10 and housing component 11 is therefore not very rigid and deforms to a great degree under the action of external forces.

The object of the disclosure is to improve the rigidity of the linear movement device specified at the beginning, wherein, in particular, the rigidity of the carriage is to be increased.

SUMMARY

According to the disclosure, this object is achieved in that the carriage has a single-piece carriage base body which extends in the longitudinal direction, wherein said carriage base body is embodied as a closed tube essentially over its entire length, with the result that it bounds a carriage cavity, wherein the guiding carriage is attached to the outside of the carriage base body, preferably directly to the outside of the carriage base body, wherein the toothed belt is guided through the carriage cavity, and wherein the first and second deflection wheels and the drive wheel are arranged within the carriage cavity. The carriage base body has a high degree of rigidity per se owing to its single-piece design. This is increased further by the fact that the carriage base body is embodied as a closed tube. It is known that closed tubes are, in contrast to slotted tubes, particularly rigid with respect to torsional loading. Insofar as it is claimed in the claim that the carriage base body is embodied as a closed tube essentially over the entire length, this is intended to express, in particular, the fact that the breakthroughs are non-damaging for the mounting means of the deflection roller and of the drive roller, since these are small compared to the entire carriage base bodies.

According to the disclosure, the toothed belt is guided through the carriage cavity, and therefore enters the carriage base body at the front side, with the result that no weakening breakthroughs are necessary in the wall of the carriage base body to lead through the toothed belt. The deflection wheels and the drive wheel are correspondingly arranged in the interior of the carriage base body, wherein, in particular for the deflection wheel, no weakening openings are necessary in the wall of the carriage base body. The guiding carriage is attached to the outside of the carriage base body, since it is the only way that the necessary guiding engagement with the guide rail can be produced. The housing is preferably manufactured from aluminum using an extrusion method, wherein the guide rail is attached directly to the housing.

Advantageous developments and improvements of the disclosure are specified below.

In one preferred linear movement device, the carriage base body has a continuous bottom wall to which the guiding carriage is attached, wherein the bottom wall has a first bottom section and a plurality of second bottom sections, wherein the first bottom section is arranged in the region of the drive wheel, while the second bottom sections are arranged in the region of the first and second deflection wheels, wherein the thickness of the first bottom section is made so large that the toothed belt plane intersects the first bottom section, wherein the thickness of the second bottom sections is made so small that they are arranged completely underneath the toothed belt plane. The rigidity of the bottom wall of the carriage base body decisively influences the rigidity of the entire carriage. The significant factor here is that the bottom plate is particularly longitudinal, with the result that the length of the guiding intervention between the guiding carriage and the guide rail is made particularly large. At the same time, a significant factor is that the bottom plate is made particularly thick so that it has a particularly high degree of intrinsic rigidity. In the proposed design, use is made of the fact that sufficient free space is present under the drive wheel, with the result that the bottom plate can be made particularly thick there. In contrast, underneath the deflection wheels the bottom plate is made thinner but is nevertheless embodied as a continuous plate. So that this region of the bottom plate does not come into contact with the toothed belt, it has to be arranged underneath the toothed belt plane, while in contrast the first bottom section can intersect the toothed belt plane easily without making contact with the toothed belt. A continuous bottom plate is to be understood as being a bottom plate which has essentially no breakthroughs. Small breakthroughs, such as are necessary, for example, for attaching the guiding carriages, are insignificant here since they hardly reduce the rigidity of the bottom plate.

In one preferred linear movement device, the carriage base body has, on the bottom wall, at least one helical duct running in the longitudinal direction, wherein the helical duct is of closed design in the first bottom section, while in the second bottom section said helical duct is embodied so as to be open toward the carriage cavity, wherein at least one helical head of a screw bolt, with which the guiding carriage is attached to the carriage base body, is arranged in the helical duct. The closed helical duct can also be inexpensively manufactured during the manufacture of the blank of the carriage base body using an extrusion method. The region of the helical duct which runs in an open fashion is inevitably produced when the blank of the carriage base body is processed in a metal-cutting fashion in order to manufacture the second, relatively thin bottom sections. The helical duct serves to hold the helical heads of the screw bolts with which the guiding carriage is attached to the carriage base body. The helical heads are typically held in a countersunk fashion in countersunk bores. However, such countersunk bores can only be manufactured very poorly in the interior of the tubular carriage base body. The manufacture of the carriage is therefore considerably simplified by the proposed helical duct.

In one preferred linear movement device, at least one closed distribution duct system for lubricant or compressed air is provided in the carriage base body, wherein the distribution duct system comprises at least a first distribution bore which extends in the longitudinal direction in the bottom wall, over the entire length of the carriage base body. Lubricant, namely lubricating oil or lubricating grease, is to be fed from the outside of the carriage to the guiding carriage via the closed distribution system. However, the distribution system can also be used to make available compressed air for a brake device which is mounted in the region of the guide rail on the carriage. The first distribution bore extends over the entire length of the carriage, with the result that a device which is arranged at any desired location on the carriage can be easy to connect to the first distribution bore. The first distribution bore can be formed in a metal-cutting fashion with a drill processing operation, but it is preferred for the first distribution bore to be manufactured along with the extrusion of the blank of the carriage base body. The front-side ends of the first distribution bore are preferably closed off with a separate closure piece.

In one preferred linear movement device, above the toothed belt plane in the first bottom section, a second distribution bore is arranged which extends transversely with respect to the first distribution bore and essentially parallel to the toothed belt plane, wherein the first and second distribution bores are connected to one another by means of a third distribution bore which runs transversely with respect to the first and second distribution bores. The second distribution bore is accessible from the outside of the linear movement device, with the result that lubricant or compressed air can be input into the distribution system. For this purpose, the first distribution bore is preferably provided with a lubricant connection or with a compressed-air connection.

It is to be noted that the first distribution bore must be inevitably arranged underneath the toothed belt plane so that it can run over the entire length of the carriage base body. The first distribution bore is therefore not readily accessible from the outside of the linear movement device.

In one preferred linear movement device, the carriage base body comprises a first and a second side wall which are spaced apart in parallel and are arranged perpendicularly with respect to the toothed belt plane, wherein said side walls are connected in one piece to the bottom wall, wherein the first and second side walls are connected to one another in one piece by means of a cover wall which is arranged above the toothed belt plane and parallel thereto. The deflection wheels and the drive wheel can easily be rotatably mounted between the parallel side walls, wherein each of the wheels is preferably assigned two rotary bearings which are each held in the first and second side walls. The cover wall, the two side walls and the bottom wall together form a closed single-piece rectangular tube, which, as described above, has a particularly high degree of rigidity.

In one preferred linear movement device, the first and second side walls have, in the region in which they run adjacent to the toothed belt, a wall thickness which is between 5% and 25% of the width of the toothed belt. The specified wall thickness determines the width of the gap which is inevitably present between the toothed belt and the U limbs of the housing base body. This gap must be made particularly small since foreign bodies can get into the housing through said gap. In the linear movement device according to the disclosure, the specified wall thickness can be made particularly small. This is due, in particular, to the fact that the specified wall region directly adjoins the first particularly thick bottom section and is connected in one piece thereto, with the result that it is reinforced thereby.

In one preferred linear movement device, the smallest distance of the toothed belt from the first and from the second side wall is between 10% and 50% of the width of the assigned side wall. This distance also determines the width of the gap remaining between the toothed belt and the U limbs of the housing. In the linear movement device according to the disclosure, this distance can be made particularly small since the carriage base body is very rigid. There is therefore no risk of the carriage base body becoming deformed under the action of an external load to such an extent that it slips on the toothed belt and damages it.

In one preferred linear movement device, the smallest distance between the housing and the first and second side walls is between 10% and 50% of the width of the assigned side wall. What has been stated with respect to the abovementioned distance between the toothed belt and the side wall also relates to this distance.

In one preferred linear movement device, at least one separate guiding carriage is arranged at the front end and at the rear end of the carriage base body, respectively. In this guide carriage arrangement, a particularly high degree of rigidity of the guiding intervention occurs between the carriage and the guide rail. The specified rigidity increases as the length of the carriage increases, since the distance between the guiding carriages becomes larger. It is to be noted here that the length of the carriage base body in the linear movement device according to the disclosure can be selected to be of any desired magnitude without this influencing the relevant arrangement of the deflection wheels and of the drive wheel. In particular, in a very long carriage a large wrap-around angle of the toothed belt at the drive wheel can also be implemented. In known omega drives, such as for example in that known from DE 34 20 936 C1, the length of the carriage is increased, which promotes the rigidity at the cost of the wrap-around angle of the toothed belt at the drive wheel. The drive forces which can be transported continuously between the drive wheel and the toothed belt become smaller as a result.

In one preferred linear movement device, the carriage base body, in particular the cover wall, runs parallel to the toothed belt in the region of the drive wheel, at such a short distance that the toothed belt is prevented from jumping over at the drive wheel. It is known that toothed belts can jump over at the drive wheel when particularly high drive forces act on them. This jumping over is promoted by inadequate pretensioning of the toothed belt. In cases of use in which the position of the carriage is determined using a rotary signal generator on the drive motor, overjumping is particularly critical since as a result the carriage position is continuously determined incorrectly. The proposed short gap between the carriage base body prevents the toothed belt from being able to be lifted out of the teeth of the drive wheel. The toothed belt is therefore prevented from jumping over from the outset. The proposed gap can be defined by one or more rotatable wheels which are held in the carriage base body, with the result that damage to the toothed belt is prevented when the latter is pushed against the carriage base body by excessively large drive forces. Furthermore, the gap can be defined by a circular-cylindrical cutout, adapted to the toothed belt, in the carriage base body.

In one preferred linear movement device, at least one longitudinal front side, preferably both longitudinal front sides, of the carriage base body are closed off with a separate cover, wherein the cover is held in a front-side cover depression in the carriage base body, wherein the depth of the cover depression is made larger than the thickness of the cover, with the result that an attachment breakthrough, which is arranged in a side wall of the cover depression, is accessible from the outside of the carriage. The cover closes off the carriage cavity, with the result that the drive device in the interior of the carriage is protected against ambient influences. The specified attachment breakthrough serves for the attachment of a superordinate assembly. Owing to the proposed embodiment of the cover depression, this attachment breakthrough is accessible from the outside of the carriage, with the result that, for example, a screwed connection can be easily provided. In known linear movement devices, undercut T-shaped grooves are often provided in the carriage base body for this purpose, by means of which grooves the carriage is screwed to the superordinate assembly. However, the problem often occurs here that the necessary screwed connection cannot be mounted since the screwing point is not accessible from the side of the superordinate assembly.

In one preferred linear movement device, a first and a second lateral stop edge for the guiding carriage are provided on the carriage base body, wherein at least one stop edge is deformed plastically in such a way that the guiding carriage is held free of play between the first and the second stop edge. The guiding carriage therefore bears laterally in a positively locking fashion on two stop edges lying opposite one another. Lateral displacement of the guiding carriage is therefore virtually ruled out. As a result of the proposed plastic deformation, the stop edges can already be manufactured along with the extrusion of the blank of the carriage base body. The distance between the offset edges is manufactured here with such a large excess dimension that during the extrusion the guiding carriage always fits between the stop edges lying opposite one another despite the large tolerances. The subsequent plastic deformation can be formed, for example, by means of punctiform caulking, i.e. a die is driven into the material of the carriage base body adjacent to the offset edge, with the result that said material flows away until it bears against the guiding carriage.

BRIEF DESCRIPTION OF THE DRAWINGS

The disclosure will be explained in more detail below with reference to the appended drawings, in which.

DETAILED DESCRIPTION

Figure 1:
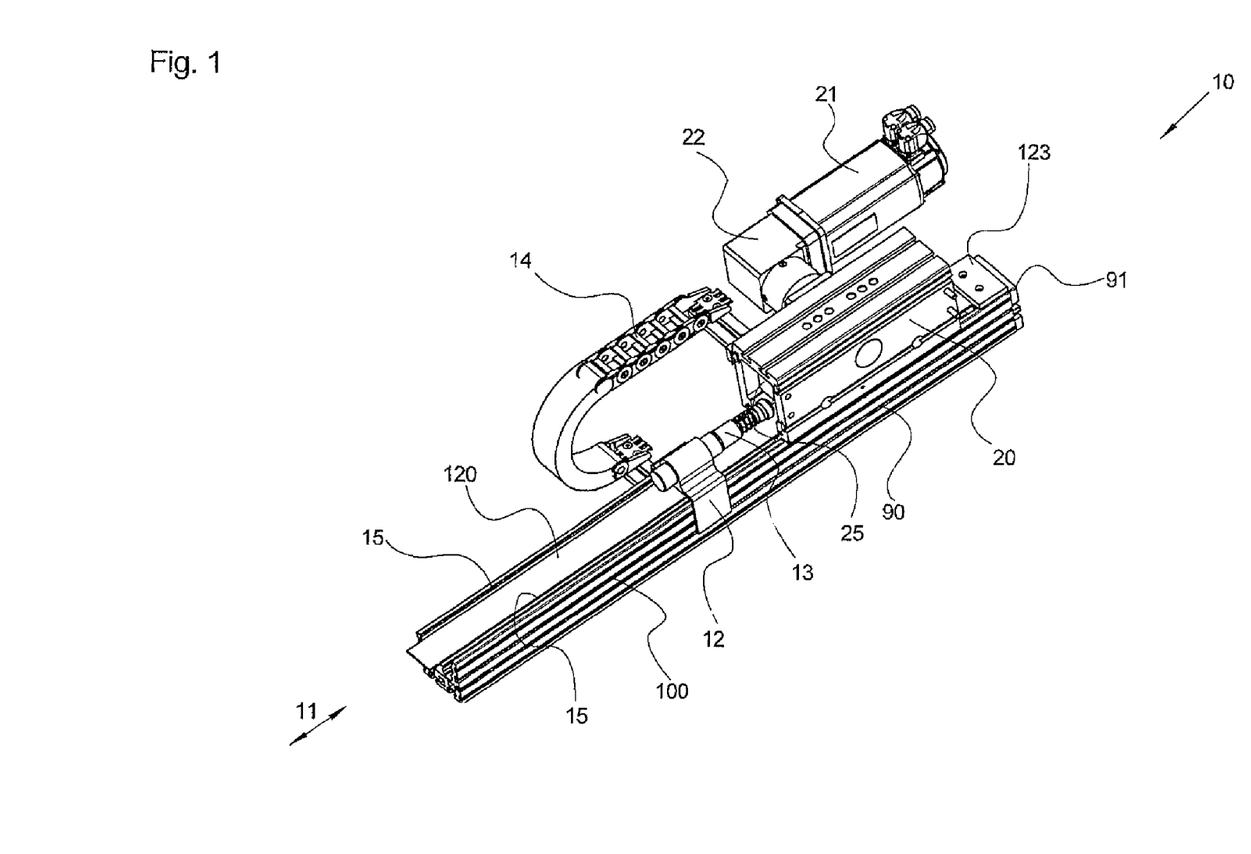
FIG. 1 shows a perspective view of a linear movement device according to the disclosure.

FIG. 1 shows a perspective view of a linear movement device 10 according to the disclosure. The linear movement device 10 comprises a housing 90 which extends in a longitudinal direction 11. A carriage 20 is mounted on the housing 90 so as to be movable in the longitudinal direction 11. The base body 100 of the housing 90 is manufactured from aluminum using an extrusion method, with the result that the housing 90 has a constant, essentially U-shaped cross-sectional shape essentially over the entire length. The guide cavity which is enclosed by the housing 90 is covered by a toothed belt 120. The two ends of the toothed belt 120 are each attached to a tensioning device 123 at the front and at the rear end of the housing 90, with the result that the toothed belt 120 can be placed under a predetermined tension. The front tensioning device which is necessary for this is not illustrated in FIG. 1. A narrow, unavoidable open gap 15 is located on each of the two sides of the toothed belt 120, details on which gap 15 will be given in more detail with respect to FIG. 2.

A hydraulically operating shock absorber 13 is attached to the housing 90 using a securing device 12. The shock absorber 13 interacts with a cover 25 of the carriage 20 in such a way that the relative movement between the carriage 20 and the housing 90 is gently braked in good time before the end position of the carriage 20 in order to avoid damage to the linear movement device 10. The carriage is connected via an angular wheel 22 to an electric drive motor 21 which sets the linear movement device 10 in motion. Furthermore, an energy supply chain 14 is provided by means of which electrical or other supply lines can be routed in a movable fashion between the carriage 20 and the housing 90. It is to be noted in this context that the linear movement device 10 according to the disclosure is provided for permanently connecting the carriage 20 to a superordinate assembly (not illustrated), wherein the housing 90 moves in the manner of an extension with respect to the carriage 20. The lines which are routed through the energy supply chain 14 therefore serve mainly to supply further devices (not illustrated) which are, for example, mounted on the end plate 91 of the housing 90.

Figure 2:
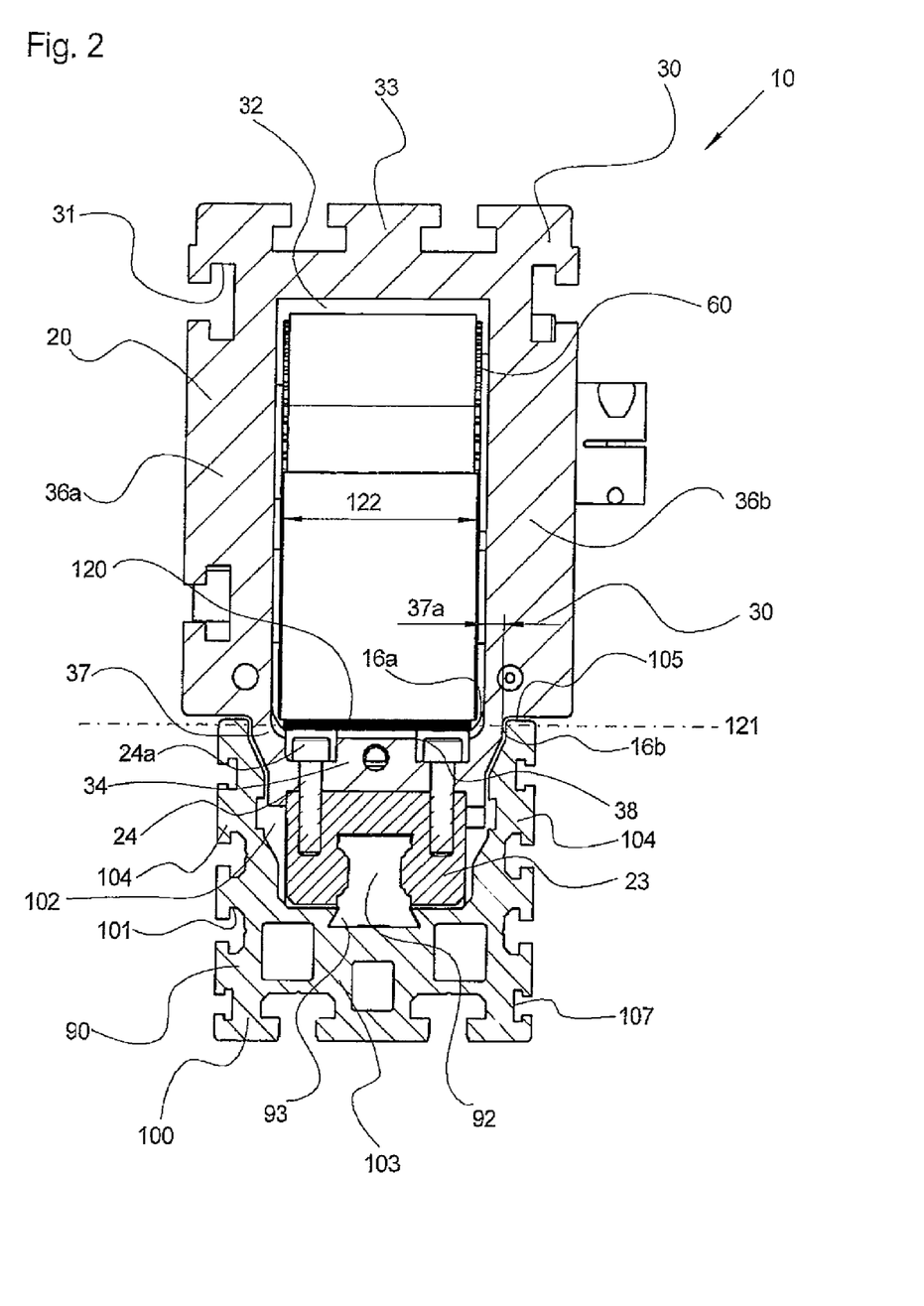
FIG. 2 shows a cross section through the linear movement device, wherein the sectional plane is characterized in FIG. 3.
Figure 3:
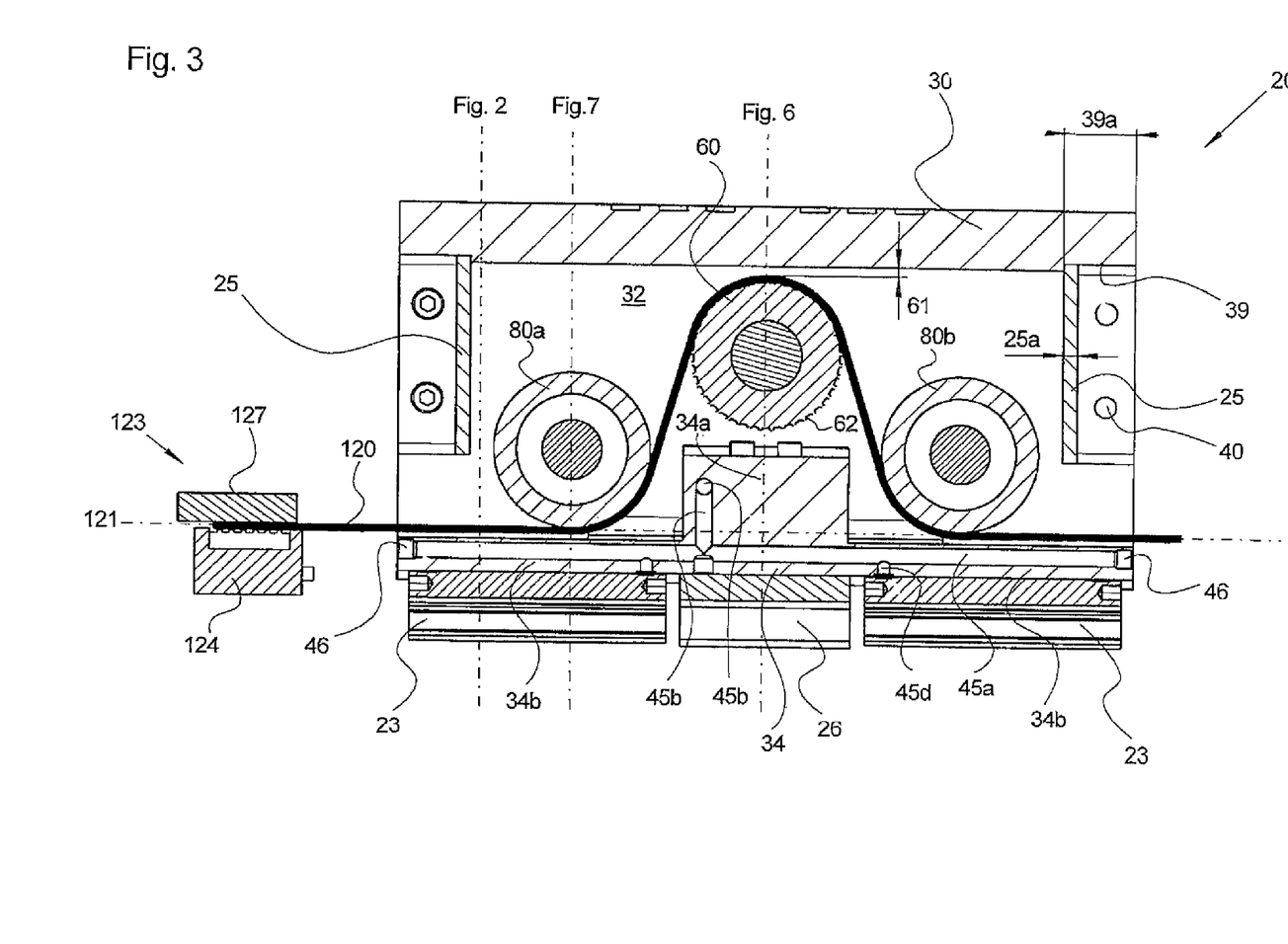
FIG. 3 shows a longitudinal section through the carriage of the linear movement device.

FIG. 2 shows a cross section through the linear movement device 10, wherein the sectional plane is characterized in FIG. 3. The carriage 20 comprises a carriage base body 30 which is embodied in one piece as a closed, essentially rectangular tube. The blank of the carriage base body 30 is manufactured from aluminum using an extrusion method, wherein it is subsequently processed in a metal-removing fashion. The carriage base body 30 comprises a first and a second side wall 36a; 36b which are arranged spaced apart parallel to one another. The toothed belt 120 runs through the carriage base body 30 between the side walls 36a; 36b in the carriage cavity 32. A cover wall, which runs above the toothed belt plane 121 defined by the tensioned toothed belt 120, is provided on the upper side of the carriage base body 33. The cover wall 33 and the side walls 36a; 36b are provided with a multiplicity of undercut T-shaped grooves 31, with the result that the carriage base body 30 can be attached to a superordinate assembly (not illustrated). In the region of the toothed belt 120, the carriage base body 30 is provided with a bottom wall 34, to which reference is made in more detail with respect to FIG. 3. A total of two separate guiding carriages 23 are attached on the bottom wall 34, said guiding carriages 23 engaging in a U shape around a guide rail 92 which is attached to the housing base body 100. The guiding carriage 23 comprises customary roller body circulating guides, such as are known, for example, from EP 0 971 140 B1. The guiding carriage 23 is screwed to the carriage base body 30 by means of a plurality of screw bolts 24. The helical heads 24a of the screw bolts 24 are held in countersunk fashion in helical ducts 38 of the carriage base body 30, which helical ducts 38 will be explained in more detail with reference to FIG. 5. The guide rail 92 is equipped with a rail base 93 which is in the form of a dovetail and is held in an adapted cutout in the housing base body 100. The housing base body 100 was forced plastically against the rail base 93 with a die at a plurality of locations adjacent to the specified cutout, with the result that the guide rail 92 is held in the housing base body 100 in a frictionally locking fashion.

The housing base body 100 which is manufactured from aluminum using the extrusion method is embodied overall in a U shape with a base 103 and two U limbs 104, wherein said housing base body 100 is provided with a multiplicity of undercut, T-shaped attachment grooves 101 for a superordinate assembly (not illustrated). Similar attachment grooves 31 are provided on the carriage base body 30 but they are made significantly larger, since they usually have to transmit significantly larger forces.

The toothed belt 120 which is tensioned flatly runs in alignment with the upper edge 105 of the U limbs 104. An open gap (No. 15; FIG. 1) remains between the toothed belt 120 and the U limbs 104 and is necessary for leading through the carriage base body 30. In this region, the carriage base body 30 has a particularly small wall thickness 37a compared to the other wall thicknesses, said wall thickness 37a being approximately 10% of the width of the toothed belt 120. The distance 16a between the toothed belt 120 and the thin wall 37 and the distance 16b between the thin wall 37 and the assigned U limb 104 are also made particularly small, with the result that the abovementioned open gap (No. 15; FIG. 1) is small overall. The gaps 16a and 16b can readily be made very small, since owing to the high degree of rigidity of the linear movement device there is no risk of the carriage becoming deformed with respect to the housing to such an extent that the specified assemblies touch one another.

Figure 6:
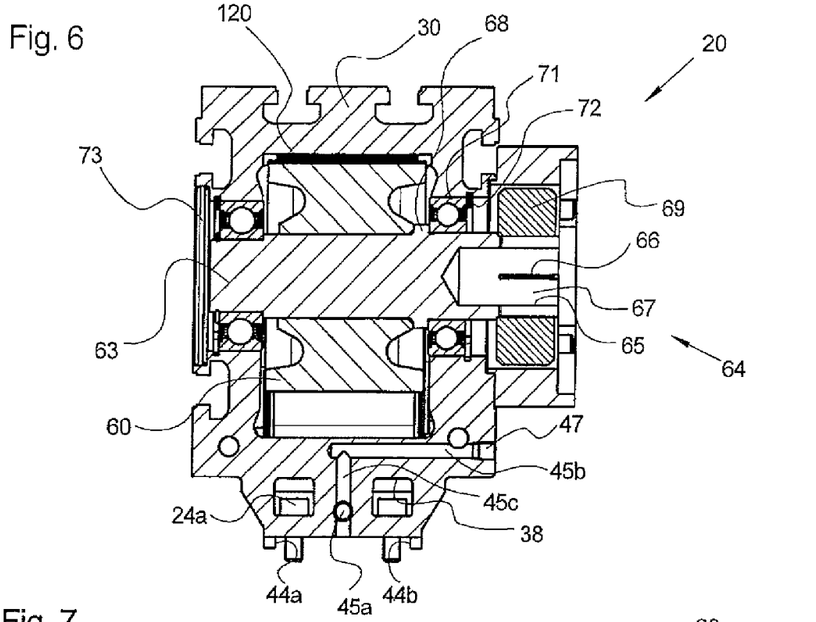
FIG. 6 shows a cross section through the carriage in the region of the drive wheel, wherein the position of the sectional plane is characterized in FIG. 3.

FIG. 3 shows a longitudinal section through the carriage 20 without the housing. A total of two guiding carriages 23 are arranged on the underside of the carriage 20, said guiding carriages 23 being respectively located at the front and rear ends of the carriage base body 30. Consequently, there is a large distance between the guiding carriages 23, with the result that the housing 90 is guided in a particularly rigid fashion on the carriage 20. A distribution system 45a-45d for lubricant, for example lubricating grease or lubricating oil, is provided in the bottom wall 34 of the carriage base body 30, with the result that the two guiding carriages 23 can be supplied with lubricant from a single lubricating connection (No. 47; FIG. 6). The distribution system 45 comprises a first distribution bore 45a which extends over the entire length of the carriage base body 30. The first distribution bore 45a is already manufactured along with the extrusion of the blank of the carriage base body 30. Said distribution bore 45a is closed off at each of its two ends with a closure stopper 46 in the form of a threaded pin. In the region of the lubricating connections (not illustrated) of the guiding carriages 23, a connecting bore 45d is provided, with the result that there is a lubricant feed connection between the first distribution bore 45a and the corresponding guiding carriage 23. The first distribution bore 45a is connected via a single third distribution bore 45c, running transversely with respect to the toothed belt plane 121, to a single second distribution bore 45b which leads to the lubricating connection (No. 47; FIG. 6).

A brake device 26, which engages around the guide rail (No. 92; FIG. 3) in a U shape, is provided between the two guiding carriages 23. The carriage 20 can be clamped tight to the guide rail (No. 92; FIG. 3) using the brake device 26, with the result that it is no longer possible for the carriage 20 to move with respect to the housing. Such brake devices 26 are used, for example, for safety reasons to prevent a vertically installed housing from automatically moving downward under its own weight when the drive fails. For this purpose, compressed air is applied to the brake device in the normal operating mode, and said brake device is therefore released. In the case of damage, the compressed-air supply is suspended, and the brake therefore engages. The compressed-air supply of the brake element is brought about by means of a distribution system which is comparable to the lubricant distribution system 45.

In each case, a rotatable deflection wheel 80a; 80b, with which the toothed belt 120 is deflected upward out of the toothed belt plane 121, is arranged in the region of the guiding carriages 23. A drive wheel 60, which is in drive-transmitting engagement with the toothed side of the toothed belt 120 via a toothing 62, is provided between the two deflection wheels 80a; 80b. The drive wheel 60 is arranged offset in the upward direction with respect to the deflection wheels 80a; 80b so that the toothed belt 120 runs freely in space over a minimum necessary length between the drive wheel 60 and the deflection wheels 80a; 80b. The deflection wheels 80a; 80b are arranged very close to the drive wheel 60 so that the wrap-around angle of the toothed belt 120 at the drive wheel 60 is large, with the result that a large drive force can be transmitted. The distance 61 between the toothed belt 120 and the cover wall 33 is made so small that the toothed belt 120 cannot jump over at the toothing 62. In the region of the drive wheel 60, a cylindrical chamfer which is adapted to the drive wheel 60 can be additionally provided in the cover wall 33, with the result that the specified short distance 61 is present along a relatively long part of the extent of the toothed belt 120.

The bottom wall 34 is embodied in the first bottom section 34a in the region of the drive wheel 60 with such a large thickness that the toothed belt plane 121 intersects the first bottom section 34a. In contrast, in the region of the deflection wheels 80a; 80b, the second bottom section 34b is embodied with a small thickness, with the result that the second bottom sections 34b run completely underneath the toothed belt plane 121. This is necessary so that the toothed belt section 120 running in the toothed belt plane 121 can be guided within the carriage cavity 32, wherein at the same time the carriage base body 30 is embodied over the entire length as a closed tube.

A separate cover 25, with which the carriage cavity 32 is closed off, is provided at each of the two front sides of the carriage 20. The cover 25 also serves as a stop face for the shock absorber (No. 13; FIG. 1) on the housing. The two covers 20 are held in an adapted cover depression 39 whose depth 39a is significantly larger than the thickness 25a of the cover 25. The side walls of the cover depression 39 which are accessible from the outside of the carriage are provided with attachment breakthroughs 40 to which a superordinate assembly (not illustrated) can be attached.

A tensioning device 123 is provided at each of the two ends of the toothed belt 120, wherein just one of the two tensioning devices 123 is illustrated in FIG. 3. The tensioning device 123 comprises a tensioning slide 124 and a clamping plate 127, between which the toothed belt 120 is clamped by means of two clamping screws (No. 128; FIG. 6).

Figure 3A:
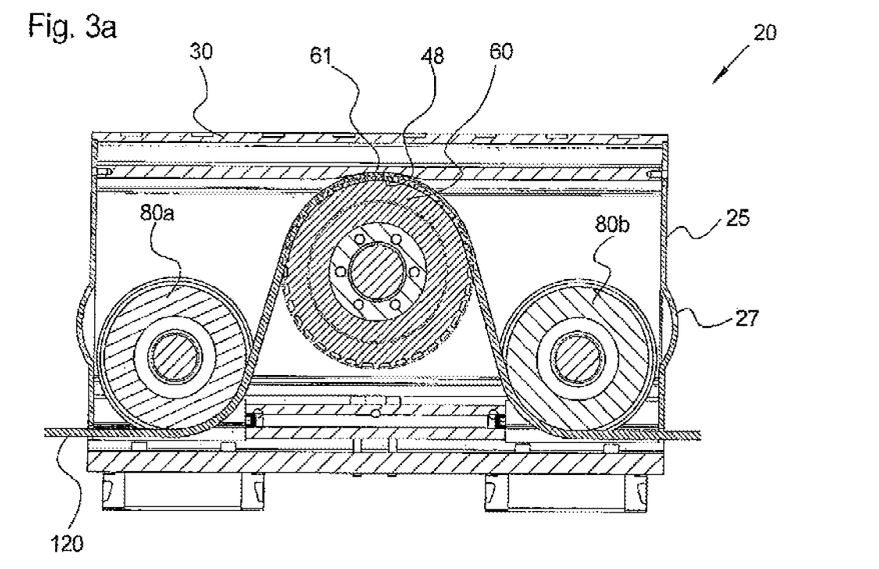
FIG. 3a shows a longitudinal section through a second embodiment of the carriage.

FIG. 3a shows a longitudinal section through a second embodiment of the carriage 20. In this embodiment, the short gap 61 between the toothed belt 120 and the carriage base body 30 was formed along a separately manufactured toothed belt cutout 48. The circular-cylindrical toothed belt cutout 48 is manufactured in a separate milling process step with the result that the position thereof in relation to the drive wheel 60 can be implemented in a very precise way. Accordingly, a particularly small value can be selected for the gap 61, with the result that the jumping over of the toothed belt 120 at the drive wheel 60 is prevented with a particularly high level of reliability. The fact that the gap 61 is not only present in a punctiform fashion but also over a relatively large length also contributes to this.

It is also necessary to note the protrusion 27 on the cover 25, said protrusion forming the stop point for the shock absorber (No. 13; FIG. 1). The protrusion 27 is embodied in the form of a spherical cap and is pressed into the cover made of sheet steel. The cover 25 therefore has a high degree of rigidity despite its small thickness, wherein, in particular, it is ensured that said cover 25 does not deform plastically under the effect of the shock absorber. In the second embodiment of the carriage 20, the cover depression (No. 39; FIG. 3) was also dispensed with so that the carriage 20 has a relatively short overall length.

Figure 4:
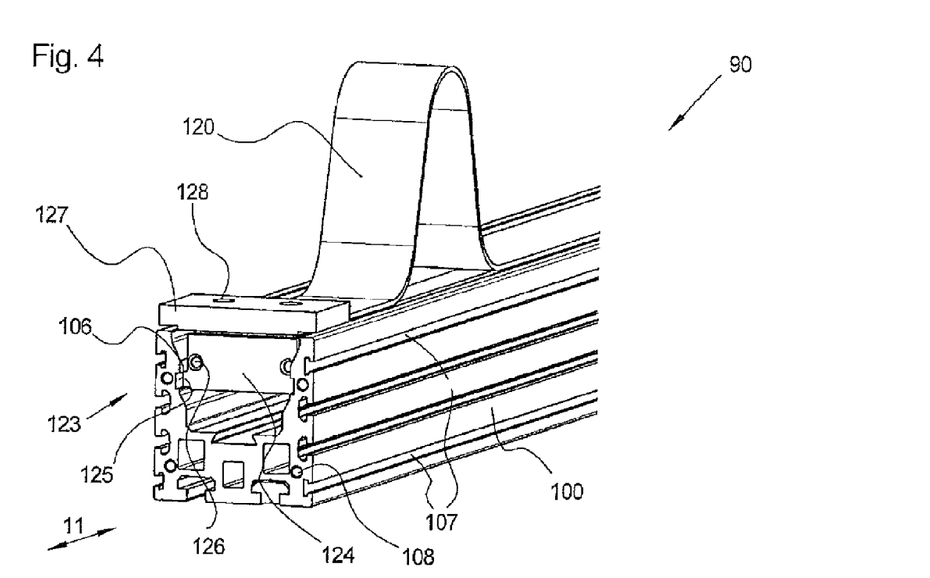
FIG. 4 shows a perspective view of an end of the housing of the linear movement device, wherein the end plate has been omitted.

FIG. 4 shows a perspective view of an end of the housing 90 of the linear movement device, wherein the end plate (No. 91; FIG. 1) has been omitted, and the tensioning device 123 can therefore be seen. The tensioning slide 124 of the tensioning device 123 is equipped with two single-piece guiding projections 125 which engage in matching grooves 106 in the housing base body 100, with the result that the tensioning slide 124 is guided in the housing 90 so as to be capable of moving in the longitudinal direction 11. Furthermore, the tensioning slide 124 is provided with two tensioning threaded bores 126. In each case a tensioning screw (not illustrated) is screwed into this tensioning thread 126, which tensioning screws penetrate the end plate (No. 91; FIG. 1). By screwing in the tensioning screw it is therefore possible to move the tensioning slide in the direction of the end plate, with the result that the toothed belt 120 is tensioned. The end plate is screwed securely to the housing base body 100 here by means of the attachment threads 108.

It is also to be noted that there are four sensor grooves 107 which are intended to accommodate known position sensors, for example inductive proximity switches. The sensors can be attached to the housing 90 in a known fashion in every longitudinal position, with the result that any desired positions of the carriage (No. 20; FIG. 1) can be covered.

Figure 5:
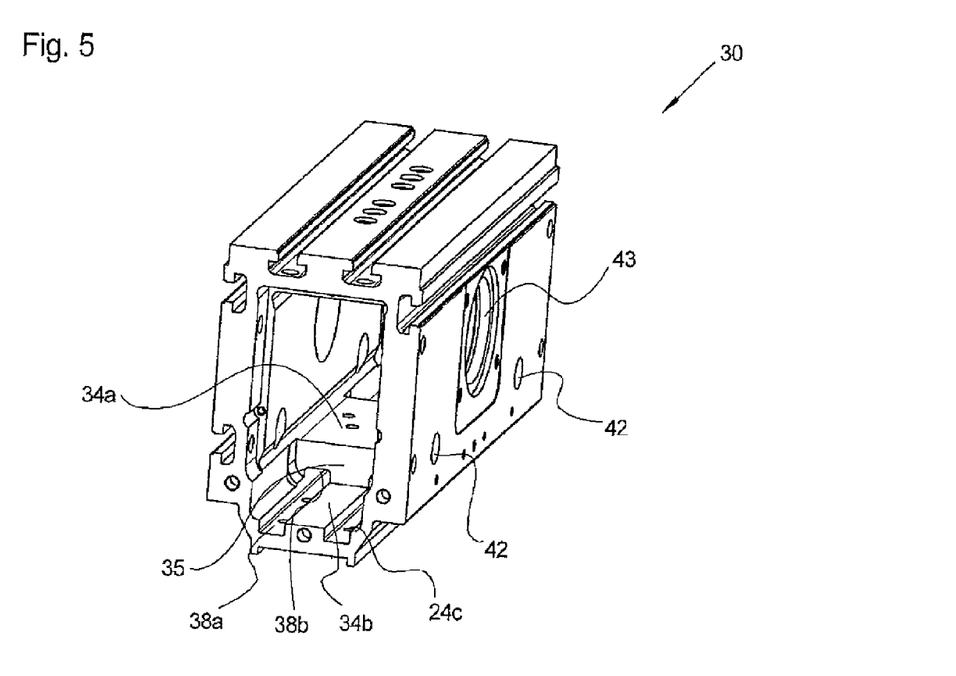
FIG. 5 shows a perspective view of the carriage base body.

FIG. 5 shows a perspective view of the carriage base body 30. The blank of the carriage base body 30 is manufactured from aluminum using the extrusion method, wherein said blank is approximately in the form of a tube with a rectangular cross section. This blank was provided at both ends with a chamfer 35 in the region of the deflection wheels (Nos. 80a, 80b; FIG. 3) in order to form the relatively thin second bottom section 34b. In this context, the closed helical duct 38a; 38b which is formed in the blank is exposed to form an open helical duct 38a which can accommodate the helical heads of the attachment screws for the guiding carriages. With the exception of the breakthroughs 24c for the attachment screws, the bottom wall 34a; 34b does not have any breakthroughs, and it is therefore embodied in a continuous way or essentially without breakthroughs, so that it has a particularly high degree of rigidity.

It is to be noted that there are bores 42 for accommodating the axles of the deflection wheels (Nos. 80a, 80b; FIG. 3), and bores 43 for accommodating the rotary bearings (No. 71; FIG. 6) of the drive shaft.

FIG. 6 shows a cross section through the carriage 20 in the region of the drive wheel 60, wherein the position of the sectional plane is characterized in FIG. 3. The drive wheel 60 is securely connected to the drive shaft 63 by means of a form fit, wherein said drive wheel 60 bears axially against a collar 68 on the drive shaft 63. It is to be noted that the drive shaft 63 is not pressed into the drive wheel 60 until the latter is already located within the carriage base body 30. The two radial deep groove ball bearings 71 are then fitted into the assigned bores 43 in the carriage 20 and onto the drive shaft 63. The position of the deep groove ball bearings 71 is defined by two locking rings 72. On the electric motor side, the drive shaft 63 is provided with a clamping device 64 for a cylindrical shaft end (not illustrated) of the electric motor or of the intermediately connected transmission. The drive shaft 63 is equipped for this purpose with a cylindrical clamping bore 65, with the result that only a small residual wall thickness of the drive shaft 63 remains. This thin wall is provided with a total of four slits 66 which run in the axial direction of the drive shaft 63, and as a result a total of four elastically flexible clips 67 are present. These clips 67 are pressed against the abovementioned cylindrical shaft end by means of a two-part clamping ring 69, with the result that said shaft end is connected in a frictionally locking fashion to the drive shaft 63. This method of clamping was selected so that the radial deep groove ball bearing 71 which is on the right in FIG. 6 can be fitted onto the drive shaft 63 beyond the clips 67. In this context, the clamping ring 69 is, of course, not located on the drive shaft 63.

On the side of the drive shaft 63 lying opposite the clamping device 64 a separate side cover 73 made of plastic is provided, said side cover 73 being clipped into the carriage base body 30 in order to close off the assigned bearing bore. FIG. 6 also shows the profile of the first distribution bore 45a, second distribution bore 45b and third distribution bore 45c and of the lubricating connection 47, which have already been explained with reference to FIG. 3.

The position of the guiding carriages (No. 23; FIG. 2) is defined with the first and second stop edges 44a; 44b. The stop edges 44a; 44b are manufactured along with the extrusion of the blank of the carriage base body 30, wherein the distance between the stop edges 44a; 44b has a larger dimension than the width of the guiding carriages. The guiding carriages 23 are therefore screwed to the carriage base body 30 in such a way that they bear against one of the stop edges. The other stop edge is then deformed plastically in such a way that it also bears against the guiding carriage 23. FIG. 6 also shows how the heads 24a of the screw bolts are held in the helical ducts 38 for the attachment of the guiding carriages 23.

Figure 7:
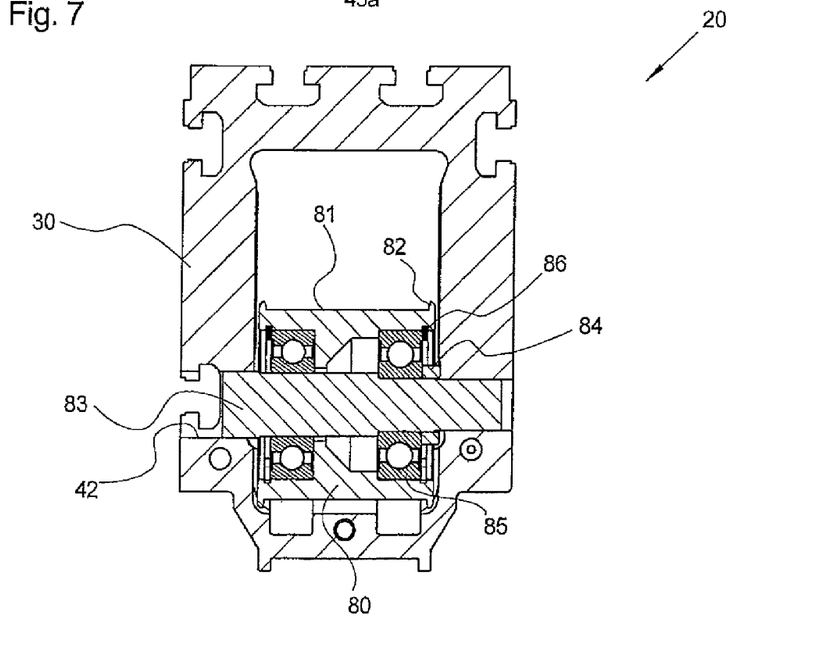
FIG. 7 shows a cross section through the carriage in the region of a deflection wheel, wherein the position of the sectional plane is characterized in FIG. 3.

FIG. 7 shows a cross section through the carriage 20 in the region of a deflection wheel 80, wherein the position of the sectional plane is characterized in FIG. 3. The deflection wheel 80 is provided with a cylindrical outer surface 81 against which the planar back of the toothed belt bears. The means of mounting the deflection wheel 80 comprises a rotationally fixed deflection axle 83, which is pressed into the carriage base body 30. Two radial deep groove ball bearings 85, which bear in a rotatable fashion the deflection wheel 80, are arranged on the deflection axle 83. The radial deep groove ball bearings 85 are held in the deflection wheel 80 by means of two locking rings 86. The deflection axle 83 is not fitted into the deep groove ball bearings 85 until the deflection wheel is already located with the radial deep groove ball bearings 85 in the carriage base body 30. In this pressing process, the mounting force is supported on the carriage base body 30 by way of a spacer ring 84 so that the ball bearing 85 is not damaged during mounting. The position of the deflection wheel 80 in the carriage base body 30 is defined by means of the spacer ring 84. The toothed belt is guided laterally with the edge 82 on the deflection wheels 80, wherein there is no comparable edge present on the drive wheel (No. 60; FIG. 6). This is necessary so that the position of the toothed belt on the drive wheel can be set freely under the action of the drive forces without the toothed belt impacting laterally on the drive wheel. This could lead to damage to the toothed belt or reduce its service life.

Figure 7A:
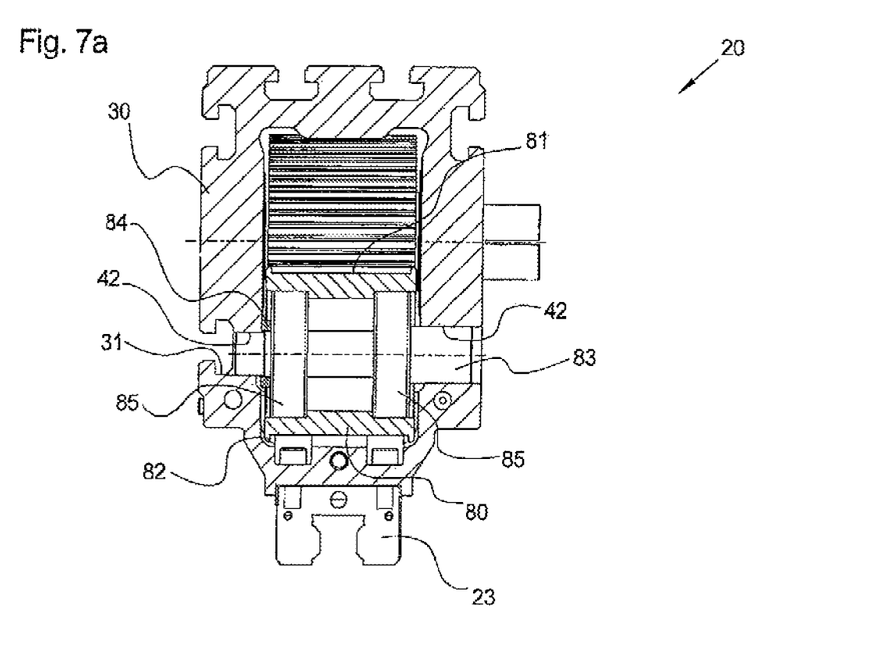
FIG. 7a shows a cross section through the second embodiment of the carriage, in the region of the deflection wheel.

FIG. 7a shows a cross section through the second embodiment of the carriage 20 in the region of the deflection wheel 80. In contrast to the embodiment according to FIG. 7, the mounting direction of the deflection axle 83 has been changed. It is now no longer necessary for the bore 42 for the deflection wheel 80 to penetrate the undercut groove 31. Furthermore, in the embodiment according to FIG. 7a, it was possible to dispense with the locking rings (No. 86; FIG. 7). Both of the radial deep groove ball bearings 85 are now embodied as fixed bearings, while in the embodiment according to FIG. 7 a fixed/free moving bearing arrangement has been selected.

Figure 8:
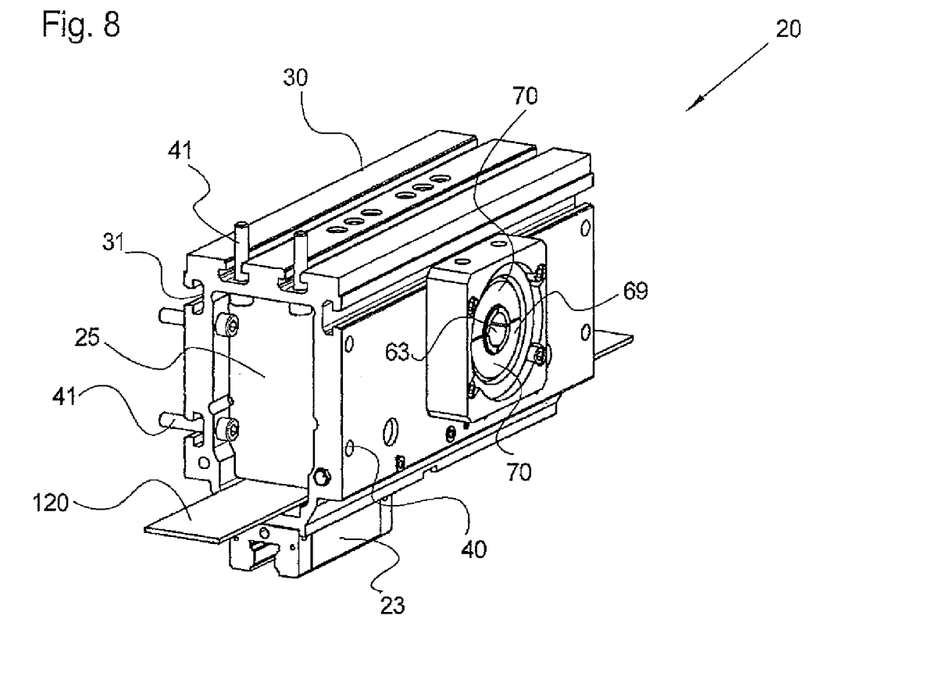
FIG. 8 shows a perspective view of the carriage.

FIG. 8 shows a perspective view of the carriage 20. It is to be noted that there are lateral attachment screws 41 which are arranged in front of the cover 25 so that they are accessible from the outside. A superordinate assembly (not illustrated) is to be attached to the carriage 20 by means of these screws 41, in particular in the cases in which the undercut T-shaped attachment grooves 31 cannot be used for reasons of accessibility. For this purpose, a total of six attachment breakthroughs 41, specifically bores, are provided at each longitudinal end of the carriage 20.

Furthermore, FIG. 8 shows that the toothed belt 120 runs at a short distance under the cover 25, with the result that the carriage 20 is open only over a narrow gap. The illustration in FIG. 3 is misleading in this respect.

Figure 9:
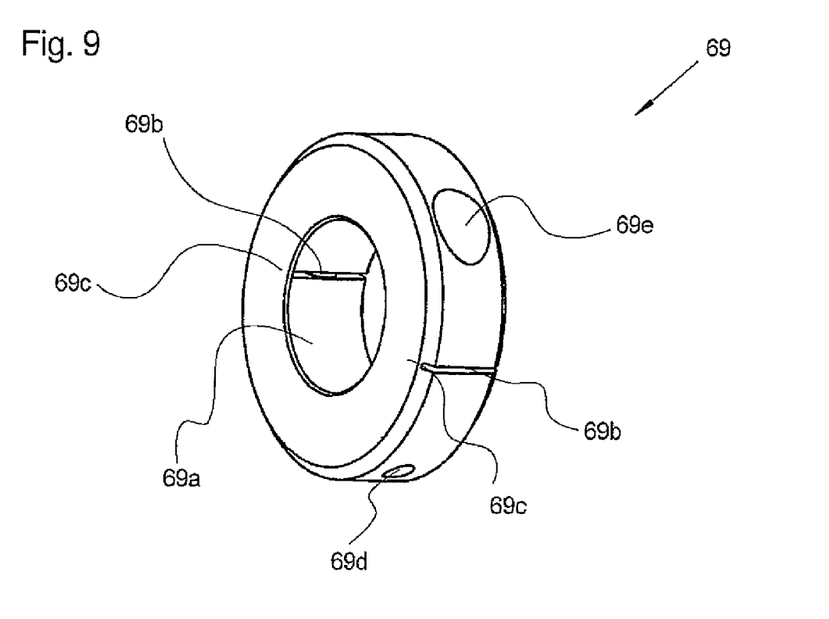
FIG. 9 shows a perspective view of the clamping ring.

FIG. 9 shows a perspective view of the clamping ring 69. The clamping ring 69 is fabricated from one piece, with the result that, in particular, the clamping bore 69a is embodied in a precisely circular-cylindrical fashion. The two narrow slits 69b are arranged in a plane which contains the central axis of the clamping ring 69. However, the slits 69b do not divide the clamping ring 69 into two halves, but instead a thin residual wall 69c is provided, which residual wall 69c connects the two halves to one another in one piece. The two slits 69b are each assigned a threaded bore 69d and a countersunk bore 69e which are designed to accommodate the clamping screws (not illustrated) in the form of cylinder head screws. The specified residual wall thickness 69c is made so small that it does not impede the clamping by the clamping screws.

LIST OF REFERENCE NUMBERS

10 Linear movement device
11 Longitudinal direction
12 Securing device
13 Shock absorber
14 Energy supply chain
15 Gap between toothed belt and housing
16a Distance between toothed belt and carriage base body
16b Distance between carriage base body and housing
20 Carriage
21 Drive motor
22 Angular wheel
23 Guiding carriage
24 Screw bolts
24a Helical head
24c Breakthrough for screw bolts
25 Cover
25a Thickness of cover
26 Brake device
27 Protrusion
30 Carriage base body
31 Undercut groove
32 Carriage cavity
33 Cover wall
34 Bottom wall
34a First bottom section
34b Second bottom section
35 Chamfer
36a First side wall
36b Second side wall
37 Thin wall
37a Wall thickness in region of toothed belt
38 Helical duct
38a Open section of the helical duct
38b Closed section of the helical duct
39 Cover depress ion
39a Depth of the cover depression
40 Attachment breakthrough
41 Attachment screw
42 Bore for the deflection wheel
43 Bore for the drive wheel
44a First stop edge
44b Second stop edge
45 Distribution duct system
45a First distribution bore
45b Second distribution bore
45c Third distribution bore
45d Connecting bore
46 Closure stopper
47 Lubricating connection
48 Toothed belt cutout 60 Drive wheel
61 Short distance from carriage base body
62 Toothing
63 Drive shaft
64 Clamping device
65 Clamping bore
66 Slit
67 Clip
68 Collar
69 Clamping ring
69a Clamping bore
69b Slit
69c Residual wall
69d Threaded bore
69e Countersunk bore
70 Half shell
71 Radial deep groove ball bearing
72 Locking ring
73 Side cover
80a First deflection wheel
80b Second deflection wheel
81 Cylindrical outer surface
82 Edge
83 Deflection axle
84 Spacer ring
85 Radial deep groove ball bearing
86 Locking ring
90 Housing
91 End plate
92 Guide rail
93 Rail base
100 Housing base body
101 Undercut groove
102 Guide cavity
103 Base
104 U limb
105 Upper edge of U limbs
106 Guiding groove for clamping slide
107 Sensor groove
108 Attachment thread for end plate
120 Toothed belt
121 Toothed belt plane
122 Width of toothed belt
123 Tensioning device
124 Tensioning slide
125 Guiding projection
126 Tensioning thread
127 Clamping plate
128 Clamping screw

What is claimed is:

1. A linear movement device comprising:
a housing; and
a carriage which can move in a longitudinal direction with respect to the housing, wherein:
the housing has a U-shaped cross-sectional shape and extends in the longitudinal direction, with the result that the housing bounds a guide cavity;
the guide cavity is covered with a toothed belt which extends in the longitudinal direction;
the toothed belt is attached at both ends to the housing with the result that said toothed belt defines a toothed belt plane;
at least one separate guide rail which extends in the longitudinal direction is arranged within the guide cavity, on which guide rail at least one separate guiding carriage is mounted in a longitudinally movable fashion, which guiding carriage is permanently connected to the carriage;
a first and a second deflection wheel, which deflect the toothed belt out of the toothed belt plane, are rotatably attached to the carriage;
a rotatable drive wheel, which is in drive-transmitting engagement with the toothed belt, is arranged between the first and the second deflection wheel;
the carriage has a single-piece carriage base body which extends in the longitudinal direction;
said carriage base body is configured as a closed tube essentially over its entire length, with the result that it bounds a carriage cavity;
the guiding carriage is attached to the outside of the carriage base body;
the toothed belt is guided through the carriage cavity; and
the first and second deflection wheels and the drive wheel are arranged within the carriage cavity.

2. A linear movement device comprising:
a housing; and
a carriage which can move in a longitudinal direction with respect to the housing, wherein:
the housing has a U-shaped cross-sectional shape and extends in the longitudinal direction, with the result that the housing bounds a guide cavity;
the guide cavity is covered with a toothed belt which extends in the longitudinal direction;
the toothed belt is attached at both ends to the housing with the result that said toothed belt defines a toothed belt plane;
at least one separate guide rail which extends in the longitudinal direction is arranged within the guide cavity, on which guide rail at least one separate guiding carriage is mounted in a longitudinally movable fashion, which guiding carriage is permanently connected to the carriage;
a first and a second deflection wheel, which deflect the toothed belt out of the toothed belt plane, are rotatably attached to the carriage;
a rotatable drive wheel, which is in drive-transmitting engagement with the toothed belt, is arranged between the first and the second deflection wheel;
the carriage has a single-piece carriage base body which extends in the longitudinal direction;
said carriage base body is configured as a closed tube essentially over its entire length, with the result that it bounds a carriage cavity, wherein the guiding carriage is attached to the outside of the carriage base body;
the toothed belt is guided through the carriage cavity;
the first and second deflection wheels and the drive wheel are arranged within the carriage cavity;
the carriage base body has a continuous bottom wall to which the guiding carriage is attached;
the bottom wall has a first bottom section and a plurality of second bottom sections;
the first bottom section is arranged in the region of the drive wheel, while the second bottom sections are arranged in the region of the first and second deflection wheels;
the thickness of the first bottom section is made so large that the toothed belt plane intersects the first bottom section; and
the thickness of the second bottom sections is made so small that they are arranged completely underneath the toothed belt plane.

3. The linear movement device according to claim 2, wherein:
the carriage base body has, on the bottom wall, at least one helical duct running in the longitudinal direction;
the helical duct is configured to be of closed design in the first bottom section, while in the second bottom section said helical duct is configured so as to be open toward the carriage cavity; and
at least one helical head of a screw bolt, with which the guiding carriage is attached to the carriage base body, is arranged in the helical duct.

4. The linear movement device according to claim 2, wherein:
at least one closed distribution duct system for lubricant or compressed air is provided in the carriage base body; and
the distribution duct system comprises at least a first distribution bore which extends in the longitudinal direction in the bottom wall, over the entire length of the carriage base body.

5. The linear movement device according to claim 4, wherein:
above the toothed belt plane in the first bottom section, a second distribution bore is arranged which extends transversely with respect to the first distribution bore and essentially parallel to the toothed belt plane; and
the first and second distribution bores are connected to one another by way of a third distribution bore which runs transversely with respect to the first and second distribution bores.

6. The linear movement device according to claim 2, wherein:
the carriage base body comprises a first and a second side wall which are spaced apart in parallel and are arranged perpendicularly with respect to the toothed belt plane; and
said side walls are connected in one piece to the bottom wall; and
the first and second side walls are connected to one another in one piece by way of a cover wall which is arranged above the toothed belt plane and parallel thereto.

7. The linear movement device according to claim 6, wherein the first and second side walls have, in the region in which it runs adjacent to the toothed belt, a wall thickness which is between 5% and 25% of the width of the toothed belt.

8. The linear movement device according to claim 6, wherein the smallest distance of the toothed belt from the first and from the second side wall is between 10% and 50% of the width of the assigned side wall.

9. The linear movement device according to claim 6, wherein the smallest distance between the housing and the first and second side walls is between 10% and 50% of the width of the assigned side wall.

10. The linear movement device according claim 1, wherein at least one separate guiding carriage is arranged at the front end and at the rear end of the carriage base body, respectively.

11. A linear movement device comprising:
a housing; and
a carriage which can move in a longitudinal direction with respect to the housing, wherein:
the housing has a U-shaped cross-sectional shape and extends in the longitudinal direction, with the result that the housing bounds a guide cavity;
the guide cavity is covered with a toothed belt which extends in the longitudinal direction;
the toothed belt is attached at both ends to the housing with the result that said toothed belt defines a toothed belt plane;
at least one separate guide rail which extends in the longitudinal direction is arranged within the guide cavity, on which guide rail at least one separate guiding carriage is mounted in a longitudinally movable fashion, which guiding carriage is permanently connected to the carriage;
a first and a second deflection wheel, which deflect the toothed belt out of the toothed belt plane, are rotatably attached to the carriage;
a rotatable drive wheel, which is in drive-transmitting engagement with the toothed belt, is arranged between the first and the second deflection wheel;
the carriage has a single-piece carriage base body which extends in the longitudinal direction;
said carriage base body is configured as a closed tube essentially over its entire length, with the result that it bounds a carriage cavity, wherein the guiding carriage is attached to the outside of the carriage base body;
the toothed belt is guided through the carriage cavity;
the first and second deflection wheels and the drive wheel are arranged within the carriage cavity; and
the carriage base body runs parallel to the toothed belt in the region of the drive wheel, at such a short distance that the toothed belt is prevented from jumping over at the drive wheel.

12. The linear movement device according to claim 11, wherein a circular-cylindrical toothed belt cutout, which runs parallel to the toothed belt at a short distance, is provided in the region of the drive wheel in the carriage base body.

13. The linear movement device according to claim 1, wherein:
at least one longitudinal front side of the carriage base body are closed off with a separate cover;
the cover is held in a front-side cover depression in the carriage base body; and
the depth of the cover depression is made larger than the thickness of the cover, with the result that an attachment breakthrough, which is arranged in a side wall of the cover depression, is accessible from the outside of the carriage.

14. The linear movement device according to claim 1, wherein:
a first and a second lateral stop edge for the guiding carriage are provided on the carriage base body; and
at least one stop edge is deformed plastically such that the guiding carriage is held free of play between the first and the second stop edge.

15. The linear movement device of claim 1, wherein the guiding carriage is attached directly to the outside of the carriage base body.

16. The linear movement device of claim 1, wherein the cover wall runs parallel to the toothed belt in the region of the drive wheel, at such a short distance that the toothed belt is prevented from jumping over at the drive wheel.

17. The linear movement device according to claim 1, wherein:
both longitudinal front sides of the carriage base body are closed off with a separate cover;
the cover is held in a front-side cover depression in the carriage base body; and
the depth of the cover depression is made larger than the thickness of the cover, with the result that an attachment breakthrough, which is arranged in a side wall of the cover depression, is accessible from the outside of the carriage.

* * * * *